(12) United States Patent
Wright (10) Patent No.: US 8,567,725 B2
(45) Date of Patent: Oct. 29, 2013

(54) ORBITAL DEBRIS MITIGATION SYSTEM AND METHOD

(75) Inventor: Richard J. Wright, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 653 days.

(21) Appl. No.: 12/883,217

(22) Filed: Sep. 16, 2010

(65) Prior Publication Data
US 2012/0068018 A1   Mar. 22, 2012

(51) Int. Cl.
*B64G 1/52* (2006.01)

(52) U.S. Cl.
USPC ............ 244/171.7; 244/172.6; 244/158.1

(58) Field of Classification Search
USPC .......... 244/172.4, 158.4, 171.7, 158.7, 158.6, 244/172.6, 158.1
See application file for complete search history.

(56) References Cited

U.S. PATENT DOCUMENTS

| | | | | |
|---|---|---|---|---|
| 4,057,449 A | * | 11/1977 | Livingston et al. | 156/167 |
| 4,991,799 A | * | 2/1991 | Petro | 244/172.6 |
| 5,071,091 A | * | 12/1991 | Kahn et al. | 244/121 |
| 5,080,306 A | * | 1/1992 | Porter et al. | 244/171.7 |
| 5,082,211 A | * | 1/1992 | Werka | 244/158.2 |
| 5,863,844 A | * | 1/1999 | Girardot et al. | 442/1 |
| 6,505,795 B1 | * | 1/2003 | Thompson et al. | 244/172.6 |
| 2010/0018026 A1 | * | 1/2010 | Bassily | 29/469 |

* cited by examiner

*Primary Examiner* — Timothy D Collins
*Assistant Examiner* — Jamie S Stehle
(74) *Attorney, Agent, or Firm* — Renner, Otto, Boisselle & Sklar, LLP (57) ABSTRACT

Fiber-based debris interceptors are used to intercept and/or contain space debris. The debris interceptors may be made up of fibers that are formed in space from a material supply on a space vehicle. The fibers for the debris interceptors may be formed by extrusion, with a heat source, such as a mirror to focus sunlight, used to heat the material of the material supply that is carried on the space vehicle. The debris interceptor may be separated from the space vehicle, and used to remove debris from an orbit, or otherwise prevent debris entering an orbit from damaging a satellite or other spacecraft that travels in that orbit. The debris interceptor may be deployed prior to later launch of a valuable spacecraft, in order to "cleanse" the intended orbit of debris. Debris objects may pass through the debris interceptor, but in so doing may lose energy so as to de-orbit.

20 Claims, 7 Drawing Sheets

ORBITAL DEBRIS MITIGATION SYSTEM AND METHOD

BACKGROUND OF THE INVENTION

1. Field of the Invention

The invention is in the field of devices and methods for mitigating orbital debris problems.

2. Description of the Related Art

Orbital debris has emerged as a serious threat to the operation of space assets, such as reconnaissance satellites, manned vehicles, and communications satellites.

Many debris sources have emerged as a result of the various space programs. Among the types of debris are non-functional satellites, expended booster stages, fragments of rocket boosters and other objects, debris from satellites (due to deterioration with age), and debris from collisions in space, such as than from the collision of the commercial Iridium 33 satellite with the defunct Kosmos 2251 satellite. It is estimated that low earth orbit contains at least 8,500 objects over 10 cm long, and over 1,000,000 objects that are over 2 mm long.

Current satellite operations are threatened by the debris threat. Ground tracking sites are able to maintain data on objects only to about 10 cm in size. The heaviest on-board shielding currently in use is on critical life support system components of the international space station (ISS); such shielding is rated only for 1 cm impacts. Maneuvering to attempt to avoid debris has major consequences to flight control operations (flight control attention, propellant use, and vehicle life risk).

From the foregoing it will be appreciated that further efforts in this area has the potential to yield benefits.

SUMMARY OF THE INVENTION

According to an aspect of the invention, a method of neutralizing space debris includes the steps of: launching a space vehicle into space; and after the launching, while the vehicle is in space, producing one or more fiber-based debris interceptors.

According to another aspect of the invention, a space vehicle includes: a material supply; and a fiber-producing device that makes fibers from the material supply.

According to yet another aspect of the invention, a debris interceptor includes: fibers of interceptor material mechanically coupled together; wherein the debris interceptor has a diameter of at least 50 meters.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

Fiber-based debris interceptors are used to intercept and/or contain space debris. The debris interceptors may be made up of fibers that are formed in space from a material supply on a space vehicle. The fibers may be metal fibers such as aluminum fibers, may be ceramic fibers, such as glass fibers, or polymer fibers, such as NYLON fibers. Fibers may be distinguished by being material in a single continuous strand with a small diameter, such as between 10 and 100 microns or less, which makes individual fibers pose at most a minimal debris threat of their own should they break loose from the debris interceptor. The fibers for the debris interceptors may be formed by extrusion, with a heat source, such as a mirror to focus sunlight, used to heat the material of the material supply that is carried on the space vehicle. The debris interceptor may have a diameter many times that of the space vehicle that produces it. The debris interceptor may be separated from the space vehicle, and used to remove debris from an orbit, or otherwise prevent debris entering an orbit from damaging a satellite or other spacecraft that travels in that orbit. The debris interceptor may be deployed prior to later launch of a valuable spacecraft, in order to "cleanse" the intended orbit of debris. Alternatively the debris interceptor may be deployed at about the same time as the spacecraft is put into orbit, perhaps being formed by the spacecraft itself, in order to protect the spacecraft while the spacecraft is in orbit. Another alternative is for the space vehicle to be launched and/or to produce a fiber-based debris interceptor in response to a debris-creating event. A further alternative is for the fiber-based debris interceptor to be used to enclose all or parts of a space vehicle, providing a "cocoon" that protects the space vehicle from debris, and/or inhibits formation of further debris by containing parts of a non-functioning space vehicle that may break loose of the vehicle. The debris interceptor may capture some debris. Larger debris objects may pass through the debris interceptor, but in so doing may lose energy sufficiently so as to be unable to maintain orbit. This reduced-energy debris may spiral into the atmosphere, where it burns up, no longer constituting a threat.

Figure 1:
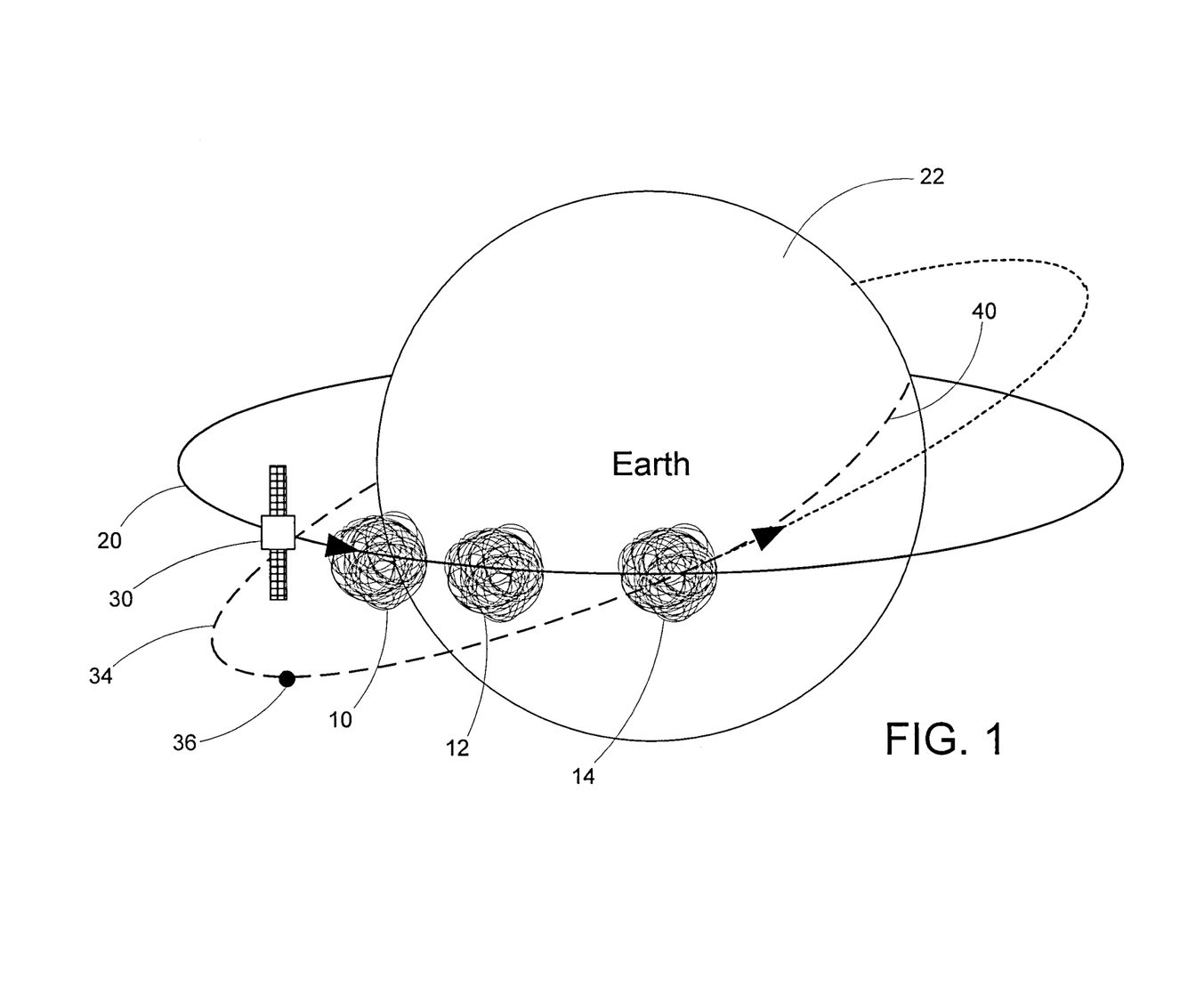
FIG. 1 is a conceptual diagram illustrating operation of fiber-based debris interceptors (FBDIs) in accordance with an embodiment of the invention.

FIG. 1 shows three fiber-based debris interceptors (FBDIs) 10, 12, and 14 deployed in an orbit 20 about the Earth 22. A high-value spacecraft, such as a satellite 30, is also travelling in the orbit 20. The orbit 20 is intersected by a debris orbit 34 containing a debris object 36. As will be appreciated, an object that is in the debris orbit 34 (or in any orbit that intersects the valued orbit 20) will continue to intersect the valued orbit 20. For example an object that starts in the valued orbit (parent orbit) 20 and then receives a pulse of energy, for instance by being separated with force from an object in the valued orbit, will embark on a new orbit (such as the debris orbit 34). This new orbit will continue to intersect with the valued orbit 20 at a minimum of one point during every orbital revolution around the Earth 22. However the location of the intersection point(s) will change from orbit to orbit, as the debris orbit 34 precesses relative to the parent orbit 20. The only way to stop the debris object 36 from eventually intersecting with the valued parent orbit 20 is for some impetus to be inflicted upon the debris object 36, knocking it out of the debris orbit 34. An additional impetus (force or energy impulse) on the debris object 36 will cause the debris object 36 to enter a new orbit. To ensure that the new orbit does not intersect the valued orbit 20, a sufficient change of momentum is required to cause the debris object 36 to enter a new orbit so low it will de-orbit.

Toward accomplishing that goal, one or more of the debris interceptors 10-14 are placed in the valued orbit 20. The debris interceptors 10-14 sweep through the orbit 20, they may collide with debris such as the debris object 36. The debris interceptors 10-14 are composed of multiple thin fibers entangled and cross-linked with one another such that the average profile presented by the fibers appear as a solid of prescribed areal density for de-orbiting debris of a given size. Collision of the debris object 36 with one of the debris interceptors 10-14 causes a change in momentum of the debris object 36 as the debris object 36 passes through the debris interceptor and it accelerates mass from the interceptor fibers. This alters the orbit of the debris object 36, taking the debris object 36 out of the debris orbit 34. Ideally the collision causes the debris object 36 to lose so much energy that the debris object 36 dips low enough into the atmosphere on its next perigee to create drag so is no longer able to sustain orbit. In that case the debris object 36 follows a decay path 40 that results in it entering Earth atmosphere and burning up.

It will be appreciated that smaller debris objects 36 may be captured and retained within the fibers of a colliding debris interceptor 10-14. In addition, the collision between the debris object 36 and one of the debris interceptors 10-14 may cause some fibers of the debris interceptor to break off, with the broken off fibers becoming debris. However, as is discussed further below, the fibers may be purposely fabricated to be fine enough (thin enough) that they do not pose a threat of causing any significant damage to orbiting objects.

The debris interceptors 10-14 may sweep out a significantly greater area than objects to be protected, such as the satellite 30. The area swept out by each of the debris interceptors 10-14 may be at least ten times the area swept out by the satellite 30. A tenfold difference in area swept out means that the debris object 36 is ten times more likely to hit any given one of the debris interceptors 10-14, than it is to hit the satellite 30. (This assumes that the satellite 30 is in the orbit 20 at the same time as the debris interceptors 10-14. As described further below, it also is possible for the satellite 30 to be placed in the orbit 20 either before or after deployment of the debris interceptors 10-14.) Considering that there are three of the interceptors 10-14 in the illustrated embodiment, it will be appreciated that there is a 97% chance that the debris object 36 will collide with one of the debris interceptors 10-14, rather than with the satellite 30. The chances of a collision with a debris interceptor are increased by increasing the size (cross-sectional area) of the debris interceptors 10-14, and by increasing the number of debris interceptors deployed.

The collisions between the FBDIs and the debris objects do not effectively transfer momentum to the FBDIs, since collision will cause deformation or breakage of the fibers, rather than transferring overall momentum to the FBDIs. The FBDIs 10-14 will experience drag from the thin rarified atmosphere at high altitude (the atmosphere produces drag on all low-orbit objects). The high ratio of frontal area to mass for these will make the FBDIs 10-14 drop faster than most orbiting objects. So if the FBDIs 10-14 are not re-boosted, then they will naturally fall out of orbit. It will be appreciated that this is an advantageous characteristics, since the FBDIs 10-14 will not themselves constitute a long-term debris threat.

The debris interceptors 10-14 may be any of a wide variety of sizes and shapes. One example is a fiber sphere having a diameter of 50 m, although it will be appreciated that other shapes and sizes are possible. It would be preferable for the debris interceptor to have a diameter at least as large as that of the valued objects that the interceptors are protecting and/or clearing an orbit for.

The FBDIs may have a substantially uniform density. Alternatively the density of the FBDIs 10-14 may be non-uniform. For example FBDIs may have hollow centers or reduced-density centers, to enable an increase in diameter for the same overall mass, without reducing the density of the fibers that are first impacted by impinging debris objects.

The debris interceptors 10-14 are produced in space, using a space vehicle to produce the fibers that make up the debris interceptors 10-14. The fibers can be produced using any of a variety of processes, such as extrusion, chemical vapor deposition on a substrate, blow forming, and mechanical shaving. Extrusion involves melting a bulk supply material, and forcing the melted material through openings to produce fibers. Chemical vapor deposition involves exposing a substrate to one or more volatile precursors, which react and/or decompose on the substrate surface to produce the desired deposit (material fibers). Blow forming is a process in which jets of gas are blown into a body of liquid melted material, producing fibers of the material. Mechanical shaving involves shaving small pieces from a parent block of bulk solid material. Details of certain extrusion embodiments are given below, but it will be appreciated that other processes may be used in place of extrusion. Further, it will be appreciated that some of the elements described below in regard to the extrusion methods will also be usable in at least some alternative fiber-producing methods. For example, chemical vapor deposition and blow forming may also utilize a heat source in performing their processes. Although other methods may be used, extrusion advantageously allows production of large volumes of fibers in short periods of time, with reduced wear on mechanisms, and with mechanisms of minimal complexity without the burden of providing additional gasses or other materials.

The term "fiber," as used herein, refers to a single contiguous body of material formed into a shape where its length is more than two orders of magnitude longer than a diameter formed with its longest cross-section. The fiber-based debris interceptors 10-14 are each composed of plural fibers, aggregated together as a unit that moves together as a single entity.

Several factors may be involved in selecting the desirable dimensions for fibers used in the debris interceptors 10-14. Among these are minimum flaw size, cross sectional area, orbital debris hazard caused by shed fibers, and surface-area-to-mass ratio. These factors are discussed in turn in the following paragraphs.

With regard to minimum flaw size, crystalline as well as amorphous solids exhibit marked changes in their properties when they are drawn down into a fiber with a small enough diameter. As soon as the fiber diameter reaches the critical flaw size, the smallest dimension a flaw in the material can exhibit, the fiber cannot have a flaw in it without breaking into more than one fiber. This means the fiber is a perfect version of the material, and is not prone to failure modes such as shattering or fatigue. The actual scalar value of this dimension varies with the type of material, so, for example, glass has a minimum flaw size different from that for ductile steel.

Any practical space-based extrusion or fiber-forming machinery will only be able to prepare melted parent material at a limited rate given the energy supply available. This is expressed as a rate at which a given volume of material can be melted. Therefore the cross-sectional area of the fiber limits how much length of fiber can be produced with time. The smaller the cross sectional area, the greater the length of fiber that can be produced in a given amount of time.

In the event a fiber is knocked loose from its parent FBDI by an impact, it becomes a debris hazard itself. If the fiber is chosen to be much smaller than typical shielding levels for satellites, then shed fiber pieces would not pose a lethal hazard of their own. From this criterion, it is clear while some materials, such as Nylon Monofilament could be produced in large diameters of 1 mm or more, without incurring critical toughness problems, these would still be undesirable since shed pieces would be hazardous to space vehicles.

A high area-to-mass ratio for smaller fibers means they will experience more drag in low orbit and de-orbit themselves. As a result, accidentally shed fiber pieces will fall out of orbit more quickly than other forms of material. Therefore such an area-to-mass ratio is desirable. In addition, natural erosion of the fibers may occur due to the presence of monatomic oxygen in the low earth orbit environment. Values for this erosion are known, and a fiber could be designed to "evaporate" to ensure an orbit would be left clear. In general, polymers exhibit erosion far faster than other materials.

The fibers may have a diameter of 100 microns or less, or (more narrowly) may have a diameter of 10 microns or less. At this size the fibers may be below the critical flaw size for their material. The small size of the fibers may mean that loose pieces of fiber are finer than the micrometeor impacts (1 mm and below) that satellites are commonly protected against with shielding.

Figure 2:
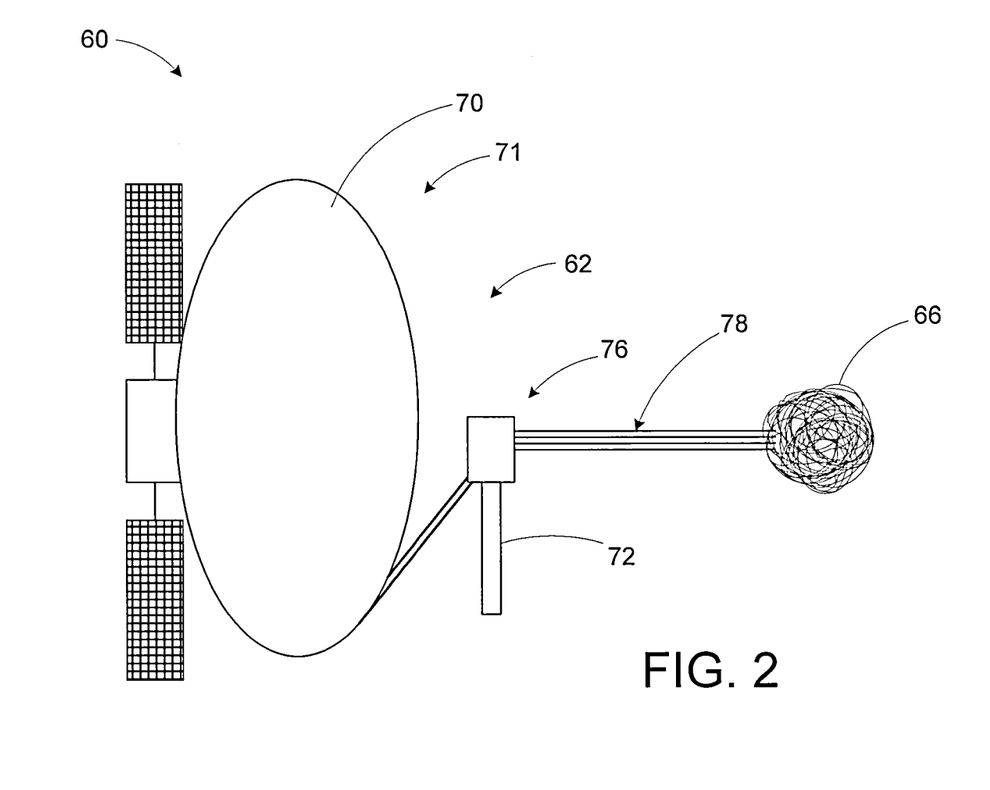
FIG. 2 is a diagram of a spacecraft that produces FBDIs, in accordance with an embodiment of the invention.
Figure 3:
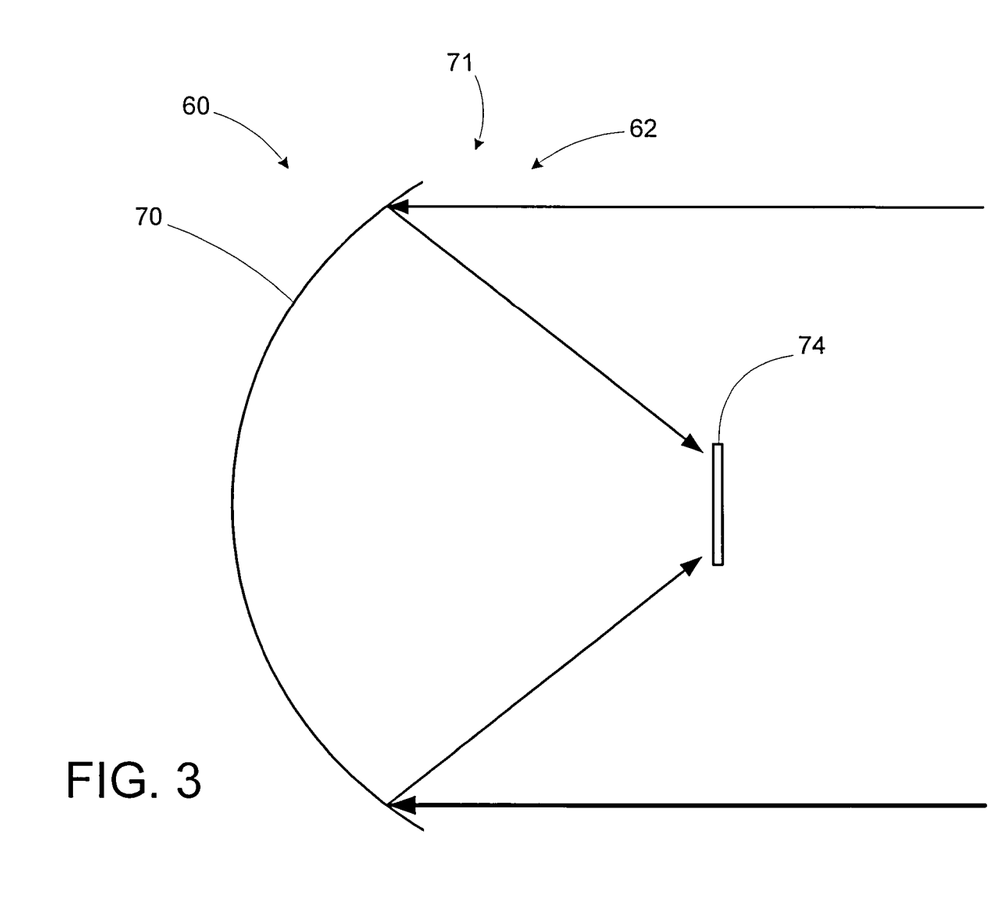
FIG. 3 is a side view illustrating operation of a parabolic reflector of the spacecraft of FIG. 2.

FIGS. 2 and 3 show a schematic view of a spacecraft 60 with an interceptor production system 62 for producing a fiber-based debris interceptor 66, which may be similar to the FBDIs 10-14 shown in FIG. 1. A parabolic reflector 70 serves as part of a heat source 71 for melting material from a feed stock (material supply) 72. The parabolic reflector 70 reflects and focuses sunlight onto a hot plate 74 (another part of the heat source 71) that is in contact with an extruder 76. The material from the feed stock 72 is fed into the extruder 76, is melted, and is extruded out of the extruder 76 in the form of fibers 78. The fibers 78 clump together, entangling and cross linking to form the FBDI 66, for example in a large spherical mass of agglomeration of the fibers 78.

Figure 4:
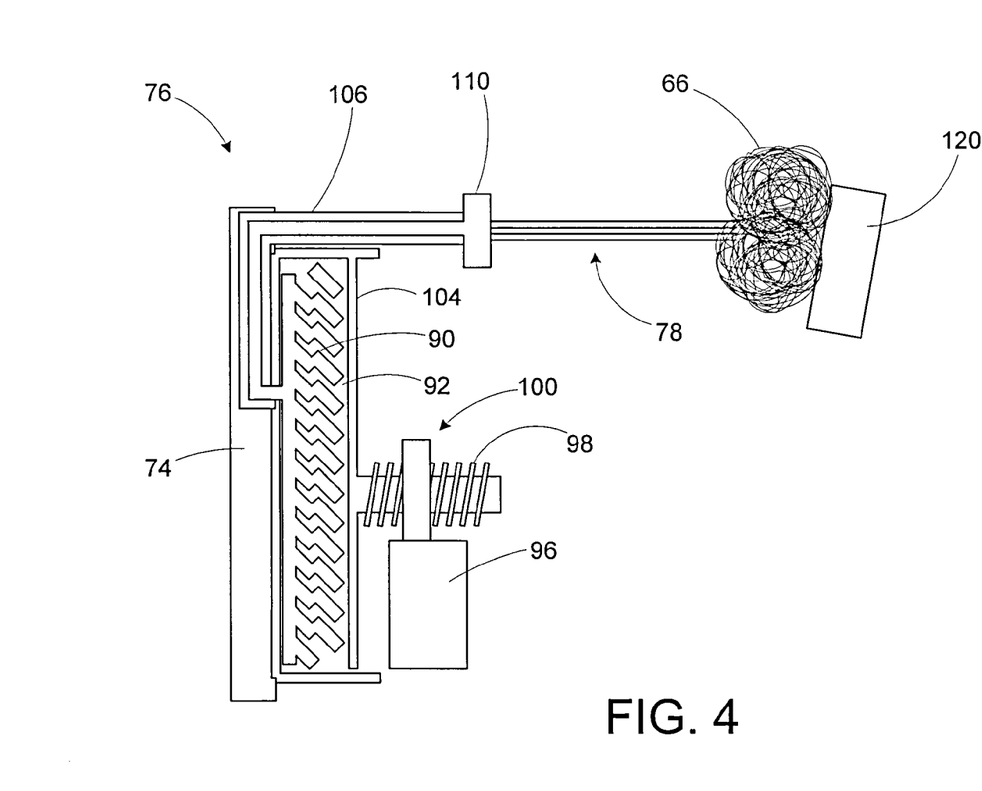
FIG. 4 is a cutaway view of one embodiment of an extruder usable with the spacecraft of FIG. 2.

FIG. 4 shows further details of one embodiment of the extruder 76. The hot plate 74 heats molten material 90 within a chamber 92 in the extruder 76. The chamber 92 functions as a location where entering material from the feed stock 72 is melted. A drive motor 96 is coupled to a screw gear 98 as part of a worm drive 100 that moves a piston 104, to push the molten material 90 out of the chamber 92. The molten material 90 flows through a metal pipe 106. The metal pipe 106 is routed through the hot plate 74 to ensure that the material 90 stays molten.

Figure 5:
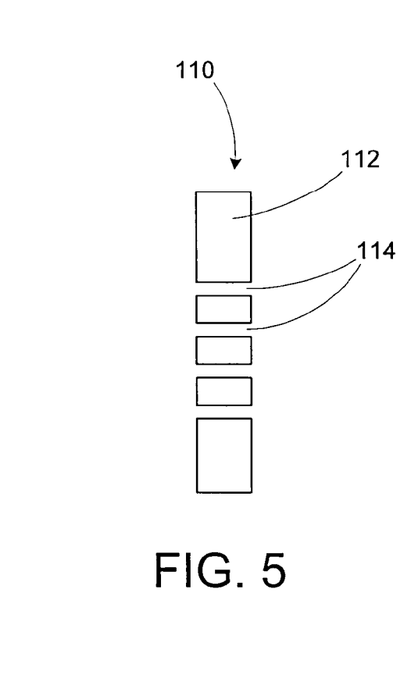
FIG. 5 is a side view of an extrusion die used in the extruder of FIG. 4.

At the far end of the pipe 106 the molten material is pushed through an extrusion die 110, to produce the fibers 78. With reference in addition to FIG. 5, the extrusion die 110 is a block of high strength material 112 with a series of fine holes 114 therein.

The fibers 78 are aggregated together at an anvil 120. The fibers 78 hit the anvil 120, and bunch and entangle to produce the debris interceptor 66. Other structures such as combs, funnels, or buckets can be alternatives to the use of an anvil, but may come with additional system complexity. Different structures may be used to create different shapes or effects for the FBDIs. For example, the fibers 78 may be directed toward a side wall of a bucket-shaped structure to create a hollow FBDI, with few or no fibers in a central section that is perhaps spherical, surrounded by a denser fiber material closer to the surface of the FBDI.

Figure 6:
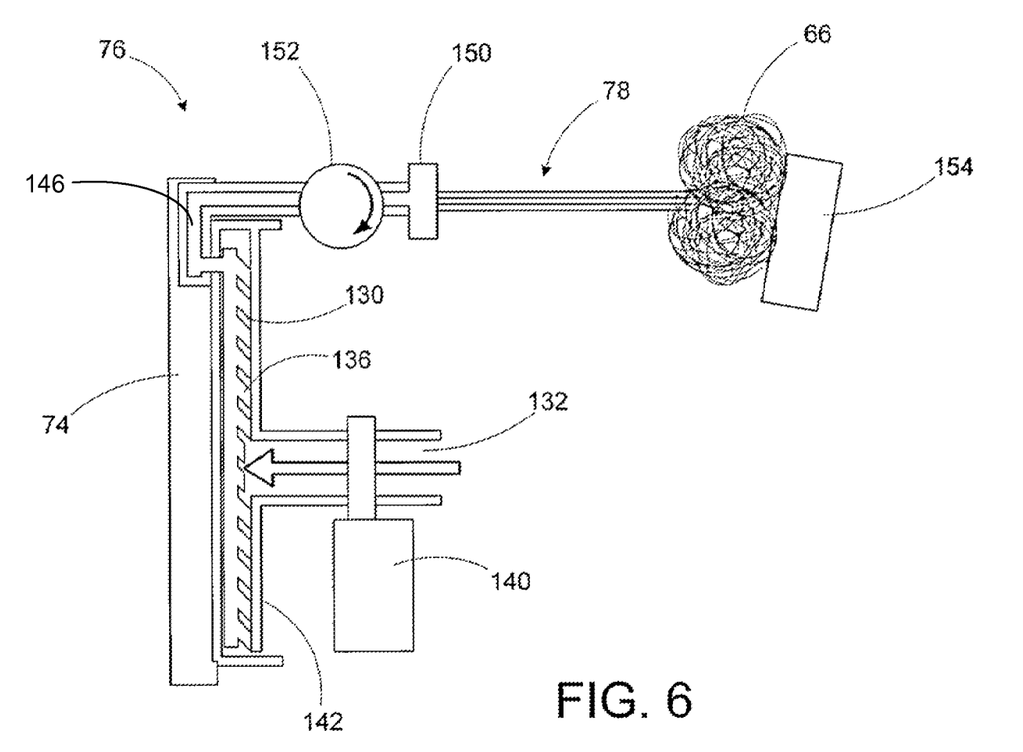
FIG. 6 is a cutaway view of another embodiment of an extruder usable with the spacecraft of FIG. 2.

FIG. 6 shows details of another embodiment of the extruder 76. In the embodiment shown in FIG. 6, material is fed into a chamber 130 through a central passage 132. With the hot plate 74 forming one side of the chamber 130, the material melts in the chamber 130, becoming molten material 136. A drive motor 140 is coupled to an impeller 142 that forms an opposite side of the chamber 130 from the hot plate 74. The drive motor 140 may be employed to spin the impeller 142. The rotation of the impeller 142 about its axis causes the molten material 136 to be driven to the edges of the chamber 130. This causes the molten material 136 to be driven through a pipe 146 that may be routed through the hot plate 74. The molten material 136 is then forced through an extrusion die 150 by a pump 152, to produce the fibers 78. As with the embodiment shown in FIG. 4, the fibers 78 bunch and entangle at an anvil 154, producing the debris interceptor 66 there.

After the debris interceptor 66 is produced, it may be separated from the spacecraft 60 (FIG. 2) by application of energy. For example a suitable cutter may be used to sever the fibers 78, perhaps followed by the spacecraft 60 using thrusters to move away from the separated interceptor 66. As an alternative, the spacecraft 60 may use the plume from its jets to push the FBDI 66 onto a new trajectory. It will be appreciated that the first method of positioning, cutting, and backing off is inherently more precise. As a further alternative a small "nanosat" vehicle having thrusters could be left attached to the FBDI to guide it for final maneuvers, or for reboost, but the use of an additional thruster vehicle may itself be an additional debris hazard.

It will be appreciated that many other layouts are possible for extruding fibers. To give one other example, centrifugal spinnerettes may be used for extrusion, utilizing vehicle rotation to propel the molten material for extrusion of fibers.

Any of a variety of suitable materials may be used for forming the FBDIs. Examples of broad categories of suitable materials are metals and ceramics. A specific example of a suitable material is aluminum. It will be appreciated that the various parts of the extruder 76 are made of materials that are able to withstand the high temperatures involved with molten metals or other materials.

The feed material may come from various sources. An initial feed material, for example a block of aluminum, may be launched with the spacecraft, or otherwise brought to the spacecraft while it is in space.

Figure 7:
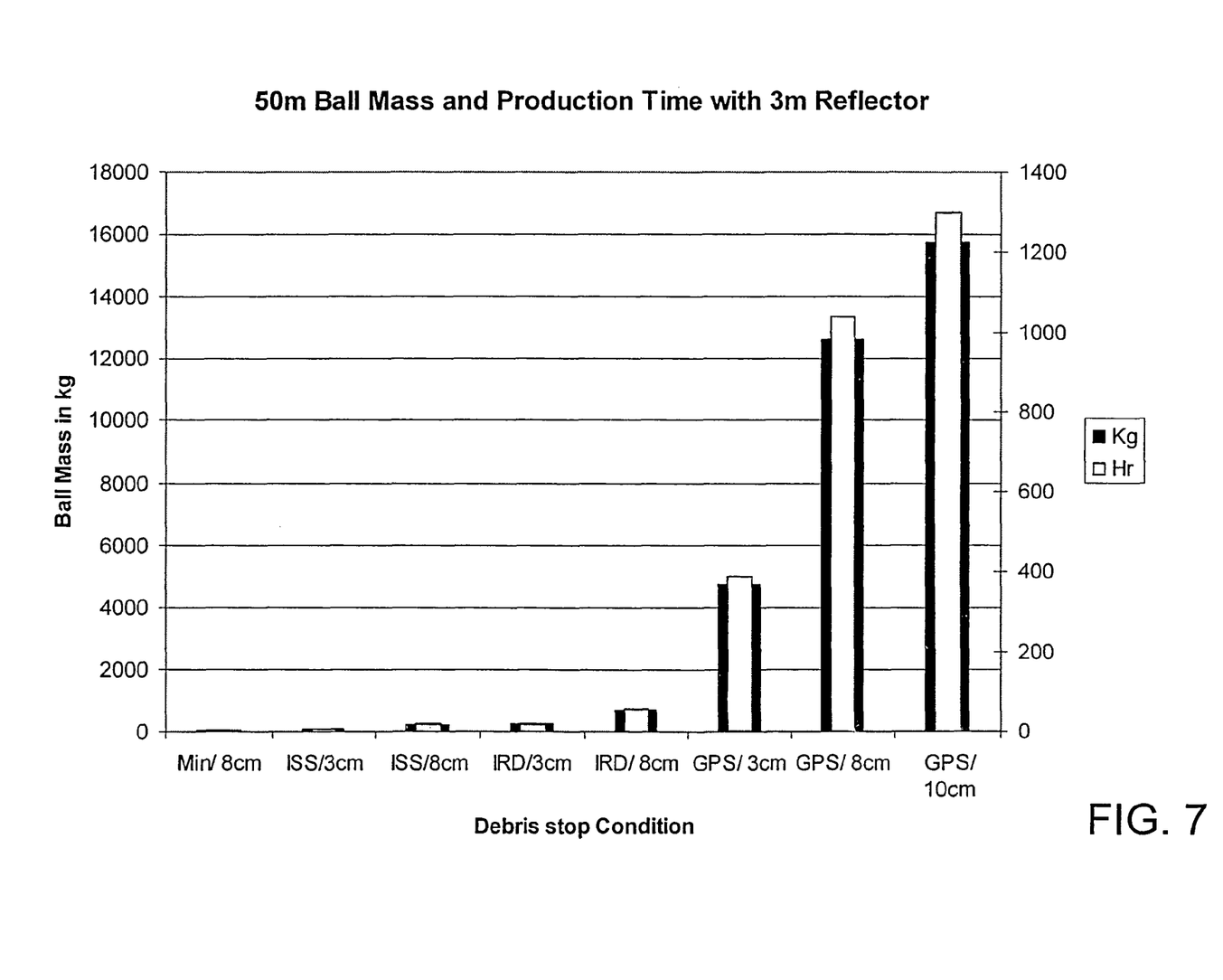
FIG. 7 is a chart showing FBDI mass and FBDI production time for various debris stop conditions.

To give some example numbers, for an FBDI made of aluminum and having a diameter of 50 m, it would take a 3 m parabolic reflector, with 20% efficiency, 2.33 hours to make an FBDI having a density of 0.000432 kg/m$^3$ (a mass of 28 kg). It would take 56 hours to produce a much denser FBDI, one having a density of 0.01 kg/m$^3$ (a mass of 680 kg). FIG. 7 shows FBDI mass and production time for various debris stop conditions. The debris stop conditions are the conditions to cause various-sized objects to be dropped, by an first encounter with an FBDI, to a perigee low enough to assure significant atmospheric. After such an encounter, the debris object will never return to the original orbit, and will deorbit in days to weeks. The debris stop conditions are expressed in terms of size of object and type of orbit, such as minimal Earth orbit (min), International Space Station orbit (ISS), Iridium (IRD), and global positioning device orbit (GPS).

Figure 8:
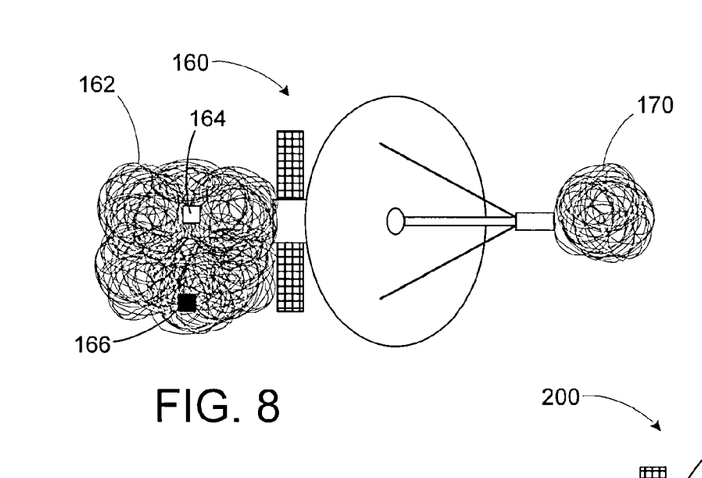
FIG. 8 is a conceptual view of a spacecraft that is able to re-ingest debris to produce FBDIs, in accordance with still another embodiment of the invention.

Another possibility, illustrated in FIG. 8, is for a spacecraft 160 to be able to reutilize materials by melting material from one FBDI 162, including debris objects 164 and 166 captured by the FBDI 162, in making a new FBDI 170. The spacecraft 160 in essence re-ingests the FBDI 162, melting down it and the debris objects 164 and 166. In this way additional metallic material may be used for making larger FBDIs, more FBDIs, and/or compensating for material lost from FBDIs due to collision with debris objects. Incompatible debris material that is not melted and reused may be left captured in fibers.

The spacecraft 160 may have other suitable systems, such as thrusters, a navigation system, and a communication system, to enable it to maneuver to recapture a previously-separated FBDI. It will also be appreciated that these additional systems may be used to maneuver the spacecraft 160 to different orbits. The spacecraft 160 may be sent to different orbits as needed, for example as debris is produced in different orbits. The possibility of recapturing material and moving to new orbits enables a variety of possible uses for the spacecraft 160, for example deploying and re-ingesting FBDIs in different orbits.

Figure 9:
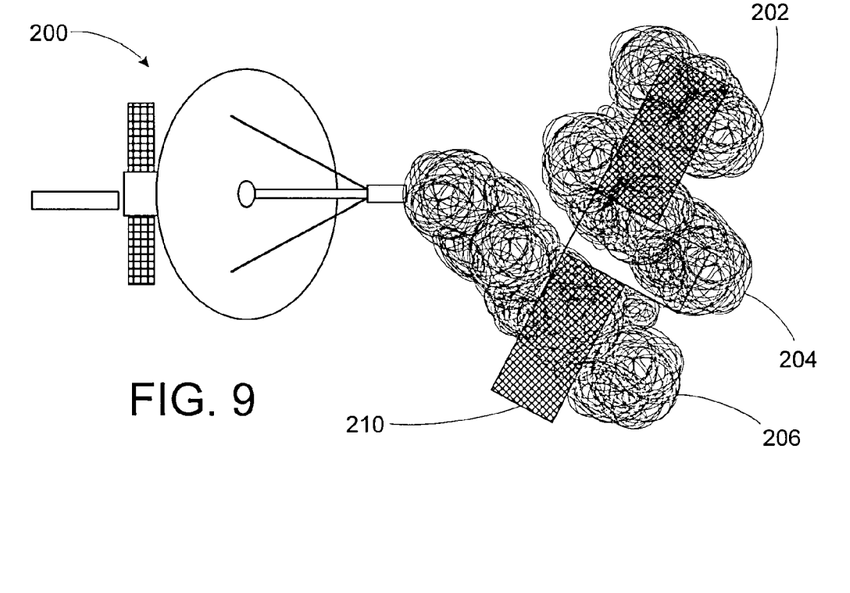
FIG. 9 is a conceptual view of still another embodiment in accordance with the present invention, showing a spacecraft being partially encased by FBDIs, in order to contain debris.

FIG. 9 shows another configuration, in which a spacecraft 200 produces fiber-based debris interceptors (FBDIs) 202, 204, and 206. The FBDIs 202-206 are used to cover parts of a satellite or other spacecraft 210. The FBDIs 202-206 may perform various functions in cocooning part of the satellite 210. First of all the FBDIs 202-206 may be used to contain debris produced from the satellite 210 from separating away from the satellite 210. Thus the FBDIs 202-206 may be used to neutralize the threat from non-operational vehicles, for example old vehicles in high orbit. Material from the satellite 210 itself may be used by the spacecraft 200 to produce the FBDIs 202-206. Alternatively (or in addition) the spacecraft 200 may utilize its own material supply.

Another function for the FBDIs 202-206 is to provide protection of the satellite 210 against at least some debris strikes. Even if a debris collision occurs, the FBDIs 202-206 help contain any part of the satellite 210 that breaks loose.

Finally, the FBDIs 202-206 may aid in making the satellite 210 visible to radar, if the FBDIs 202-206 are made of metal. It will be appreciated that it would be advantageous to increase detectability by radar of satellites, especially of non-operational satellites.

The FBDIs described herein may be used in any of a variety of modes of operation. One mode of operation is in clearing new orbits. FBDIs may be produced and deployed in advance of the launch of a new system. These FBDIs may be used to clear an orbit or orbits of interest that new systems are going to be deployed into. The level of clearance achieved is a function of FBDI area, the number of FBDIs, and the time that the FBDIs are on orbit before the introduction of the new system.

Lower orbits require less momentum transfer to clear. Higher orbits have lower debris rates, and less of a need to be cleared. However, the mass requirements for FBDIs quickly increase with orbit altitude. At low orbits FBDIs can be very potent debris removers at low mass, for changing momentum of debris sufficiently to cause the debris to de-orbit.

A second mode of operation is use of FBDIs to protect payloads on-orbit. One or more FBDIs may be deployed in the same orbit as a high-value spacecraft to protect the spacecraft against the ongoing hazard from debris. The FBDIs intersect debris objects at a rate proportional to the cross sectional area of the FBDIs. The reduced threat to the payload is proportional to the payload cross sectional area divided by the total cross sectional area of the FBDI(s). It will be appreciated that this mode may be combinable with the first mode, in that FBDI(s) may be put into place prior to launch of the high-value payload, and left in place after the high-value payload is launched into place. If the second mode is used alone, the FBDI(s) may be produced either by the high-value payload, or by a separate spacecraft.

A third mode of operation is cleanup after a debris-shedding event. After a debris-spawning effect, such as a collision, all subset debris orbits from the event are related to the original orbits, and intersect with one of the original orbits. Cleaning up the area around the original object can be accomplished by placing one or more FBDIs in the original orbit. Multiple FBDIs can be used to speed the process. Rather than try to locate and track the debris objects, the method is passive, with the debris objects eventually intercepting the FBDI (s).

A fourth mode of operation is the cocooning of failed satellites or other high-orbit spacecraft. This mode of operation has been described above in connection with FIG. 9. This mode of operation is most advantageous for preventing debris hazards at high orbits, where natural processes for de-orbiting debris can take years or centuries, and the propellant burden for de-orbiting failed satellites makes their removal impractical.

The various embodiments described herein provide for passive interception of debris. It will be appreciated that using passive debris interception for clearing or protecting orbits of interest may involve significantly less effort that approaches to the debris problem that attempt to use active debris reduction to eliminate all debris from the sky. In the methods presented here, specific orbits are cleared of debris and/or protected from debris. Non-intersecting debris (debris that does not intersect the orbit(s) of interest) is ignored, since it does not pose a threat to the orbit(s) of interest. Interception of debris from orbit(s) of interest is a practical solution and provides a way to reduce the debris threat in the short-term for certain orbits of interest. In addition it will be appreciated that preventing breakup of existing old, expired, or nonfunctional vehicles is better than attempting to clear debris from them.

Cross linking via entanglement of the fibers holds the FBDIs together, even if holes are punched through them by debris collisions. There is further damage tolerance in that spalling, tearing, and fragmentation are not failure modes that produce new hazardous debris for this form of material. Additional stopping power may be simply a matter of adding more fiber to the FBDIs.

Another advantage of the present system and method is that a large size range of debris objects are intercepted and interdicted. Objects that are larger than present shielding can handle (about 1 cm diameter objects for the heaviest on-board shielding, such as on critical life support components), which are still smaller than can be reliably tracked using ground-base tracking systems (about 10 cm diameter objects), can be neutralized by the systems and methods described herein. Thus these systems and methods fill a gap in the existing state of the art.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of neutralizing space debris, the method comprising:
   launching a space vehicle into space; and
   after the launching, while the vehicle is in space, producing via a manufacturing process one or more fiber-based debris interceptors, wherein the manufacturing process includes one or more of extrusion, chemical vapor deposition on a substrate, blow forming, and mechanical shaving.

2. The method of claim 1, further comprising separating the one or more fiber-based debris interceptors from the space vehicle.

3. The method of claim 2, further comprising, after the separating, launching a spacecraft into a same orbit as the one or more debris interceptors.

4. The method of claim 3, wherein the launching of the spacecraft occurs after the one or more debris interceptors have removed debris from the orbit.

5. The method of claim 1, wherein the producing includes extruding fibers that are used to produce the one or more fiber-based debris interceptors.

6. The method of claim 5, wherein the extruding fibers includes extruding fibers that have a thickness of 100 microns or less.

7. The method of claim 1, wherein the producing includes producing the one or more debris interceptors to cover at least part of an exterior of the space vehicle.

8. The method of claim 7, wherein the one or more debris interceptors prevent parts of the space vehicle from escaping away from the space vehicle.

9. The method of claim 1, wherein the producing occurs in response to a debris-creating incident.

10. The method of claim 1, wherein the space vehicle includes a fiber-producing device that makes fibers from a material supply.

11. The method of claim 10, wherein the fiber-producing device includes an extruder for extruding fibers.

12. The method of claim 10, wherein the space vehicle further includes a heat source that heats material from the material supply.

13. The method of claim 12, wherein the heat source includes a parabolic reflector that concentrates sunlight on a hot plate that is in contact with the material from the material supply.

14. The method of claim 2, further comprising changing the orbit of the space vehicle in order to allow production of one or more fiber-based debris interceptors in one or more selected orbits.

15. The method of claim 1, wherein the one or more fiber-based debris interceptors include plural fibers aggregated together, the plural fibers not existing before the launching a space vehicle into space.

16. A method of neutralizing space debris, the method comprising:
   launching a space vehicle into space; and
   after the launching, while the vehicle is in space, producing one or more fiber-based debris interceptors, wherein the producing includes one or more of extrusion, chemical vapor deposition on a substrate, blow forming, and mechanical shaving;
   wherein the fiber-based debris interceptors include plural fibers mechanically coupled together, the plural fibers not existing before the launching a space vehicle into space.

17. The method of claim 16, wherein the fiber-based debris interceptors include only the plural fibers.

18. The method of claim 16, wherein the producing includes extruding fibers that are used to produce the one or more fiber-based debris interceptors.

19. The method of claim 16, wherein the plural fibers have a diameter less than or equal to 100 microns.

20. The method of claim 16, wherein the fibers have a diameter less than or equal to 10 microns.

* * * * *